United States Patent Office

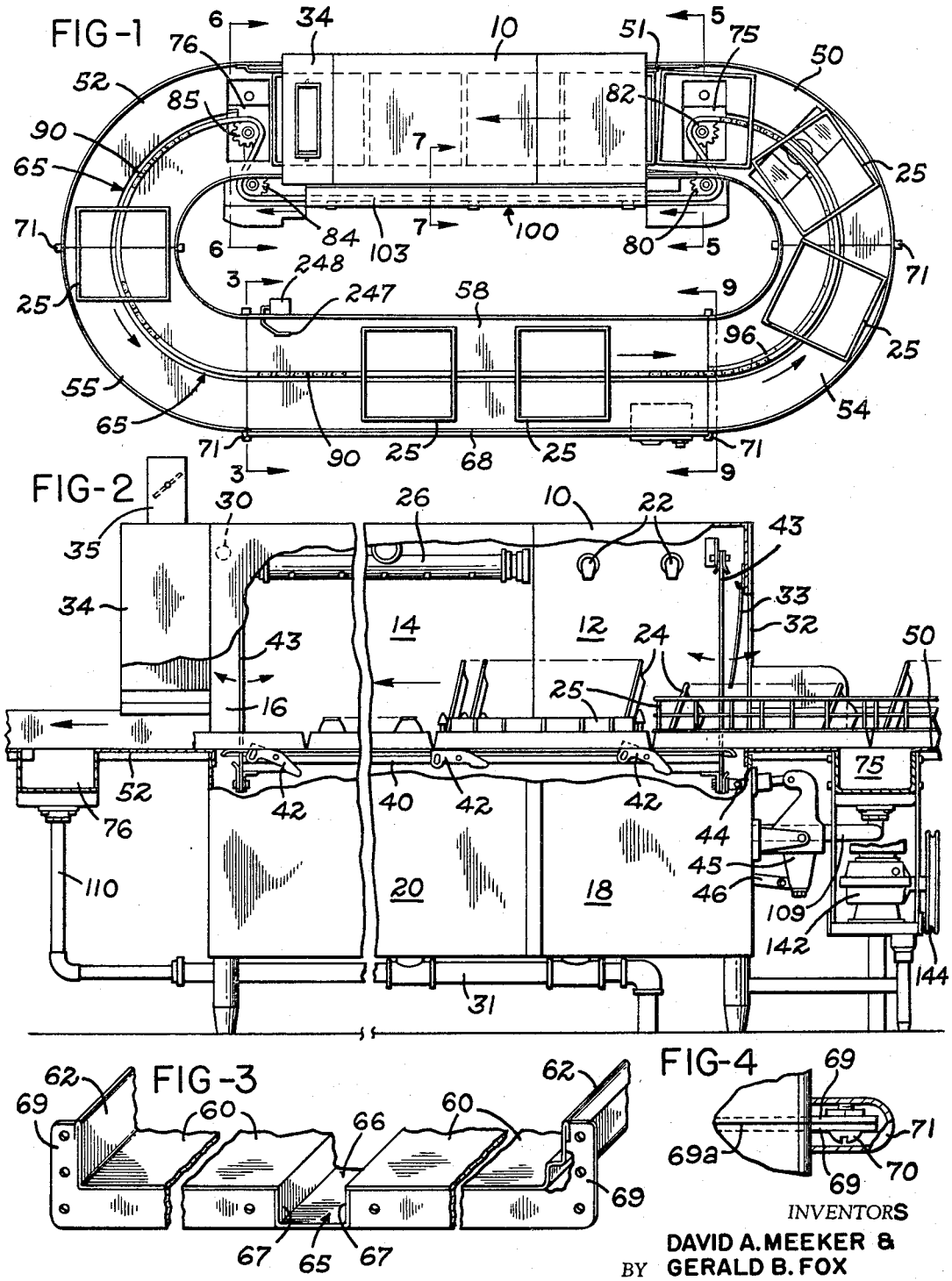

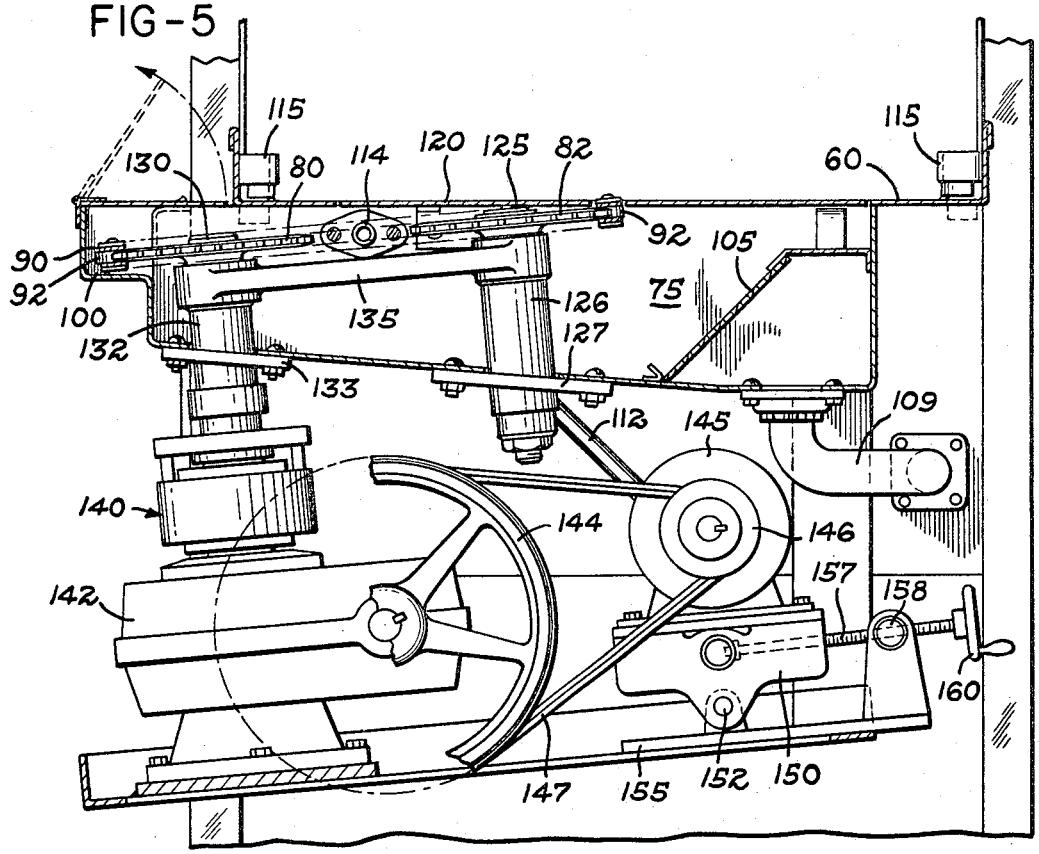
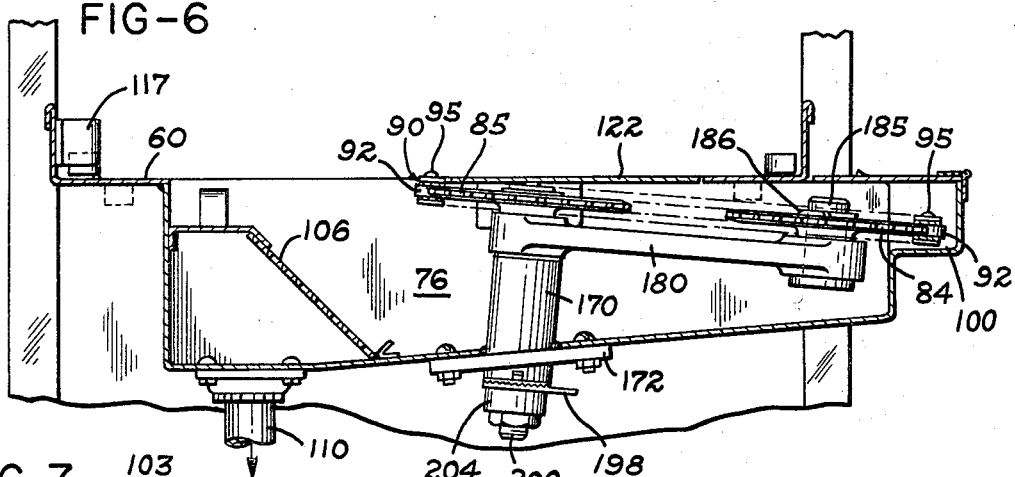
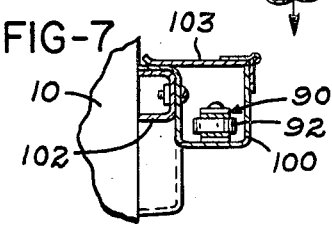

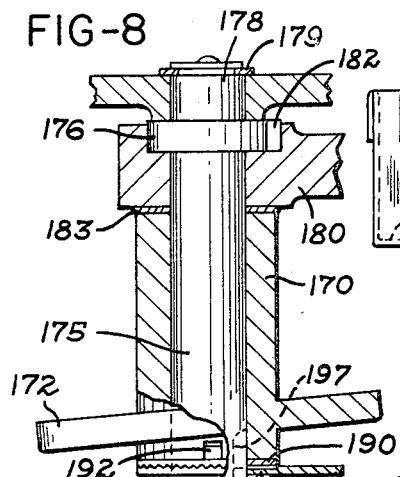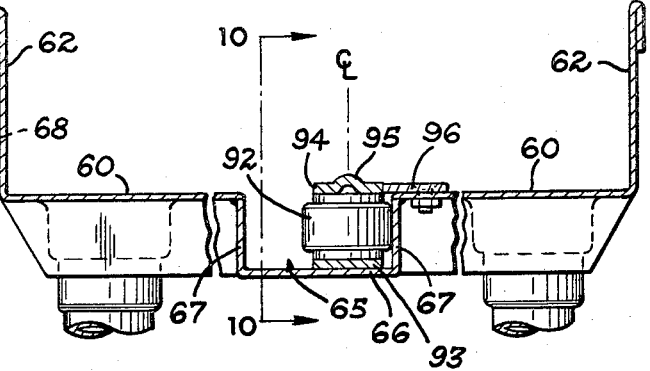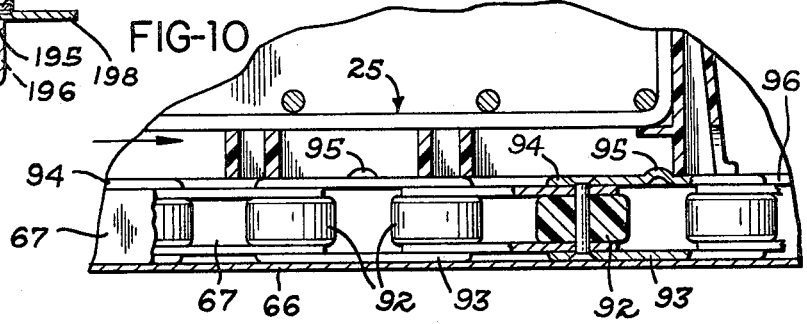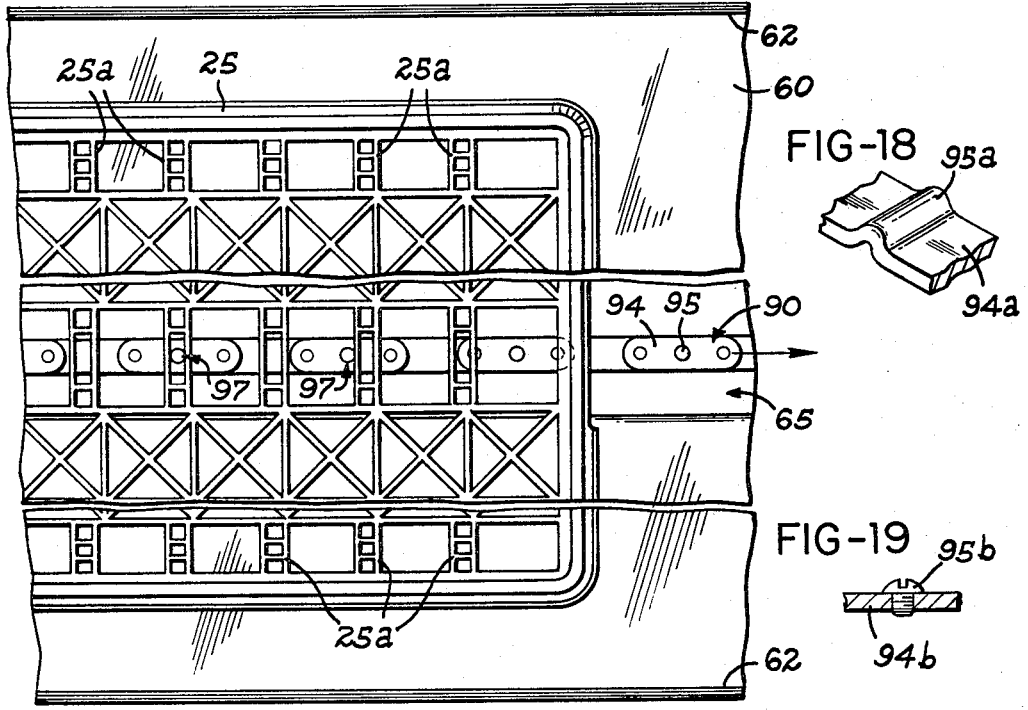

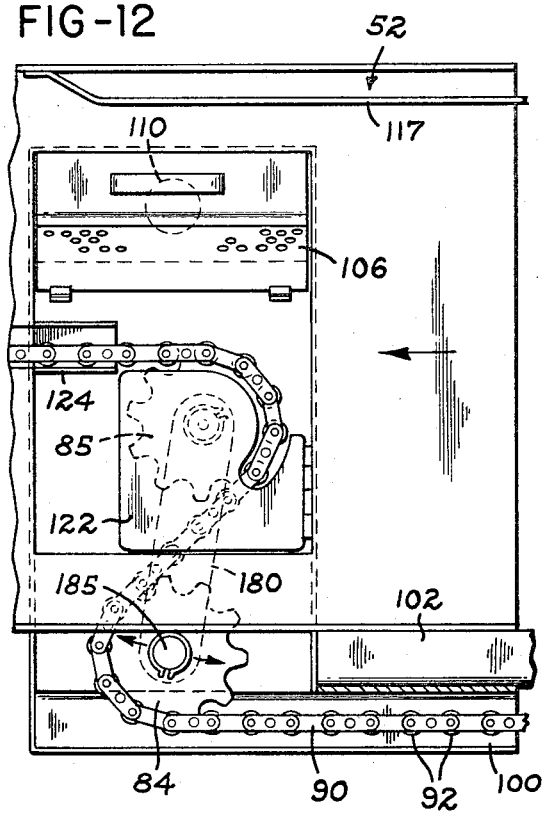
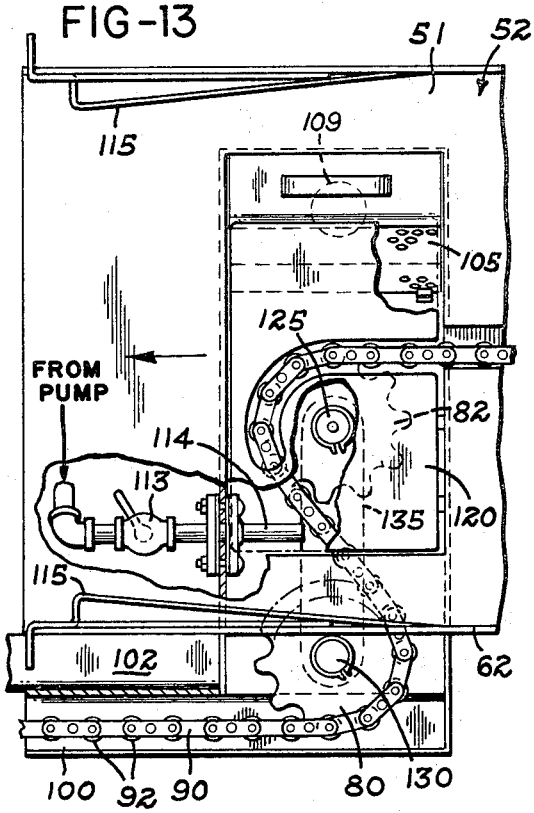
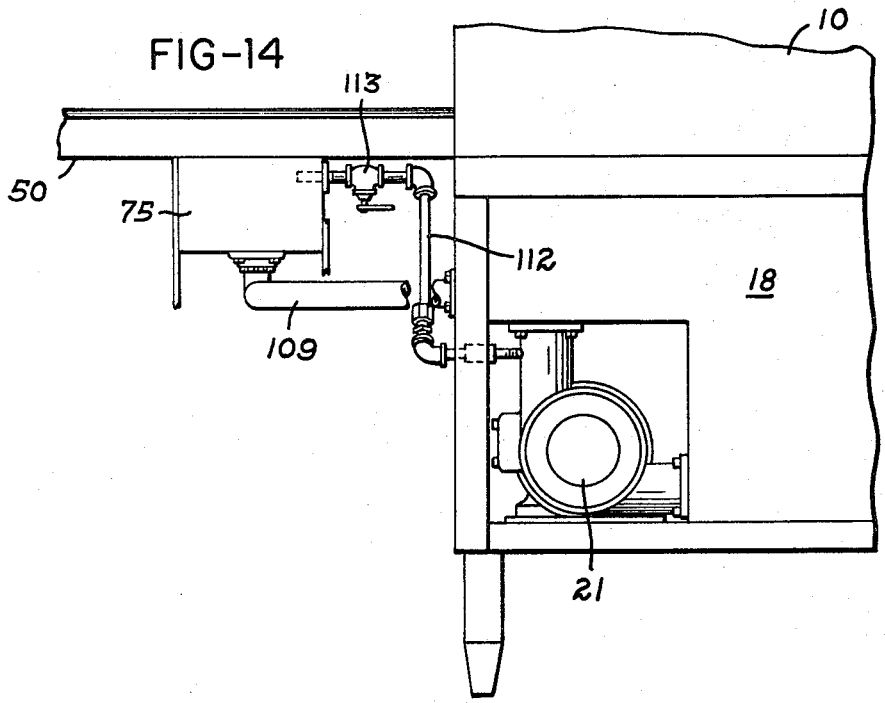

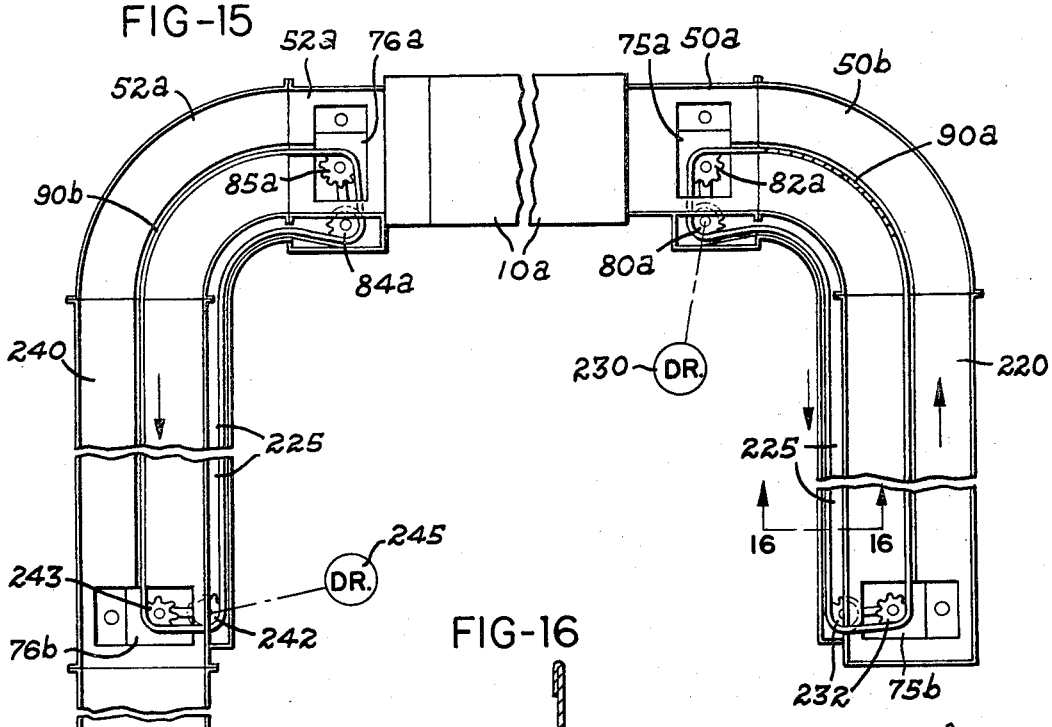
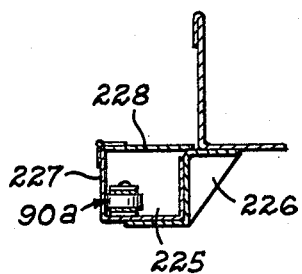
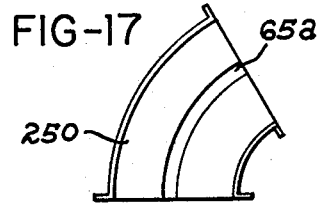
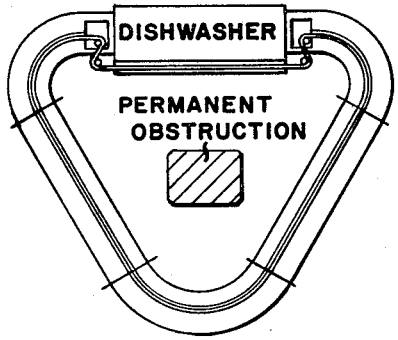
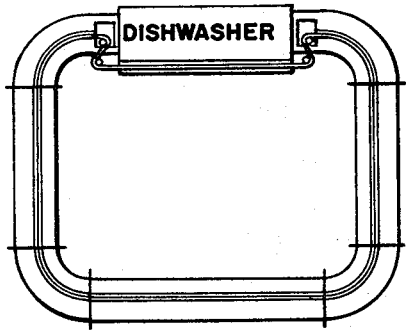

3,384,097
Patented May 21, 1968

3,384,097
DISHWASHING APPARATUS
David A. Meeker and Gerald B. Fox, Troy, Ohio, assignors to The Hobart Manufacturing Company, Troy, Ohio, a corporation of Ohio
Filed Apr. 8, 1966, Ser. No. 541,190
11 Claims. (Cl. 134—46)

ABSTRACT OF THE DISCLOSURE

A dishwashing machine, with an internal conveyor operating at a predetermined speed to carry racks of soiled articles through the machine, is provided with a conveyor for feeding the racks of soiled articles to the machine, at a rate in excess of the rate of operation of the internal machine conveyor, to tend to eliminate excessive space between racks as they pass through the dishwashing machine. In some embodiments the conveyor is an endless chain which is guided around the dishwashing machine and also functions to remove racks of cleansed articles from the machine at a somewhat greater rate to space the racks apart and facilitate further handling thereof. A connection is provided to flush the conveyor chain with cleansing water, and a shelf-like arrangement is provided along the conveyor for supporting one or more racks out of engagement with the conveyor chain. A control is provided to prevent racks of cleansed articles from passing to sections of the conveyor where racks of soiled articles are placed on the conveyor.

---

This invention relates to dishwashing apparatus, and particularly to an improved form of such apparatus in which racks of soiled dishes to be cleansed are supplied at an optimum rate to acihve the most efficient use of the dishwashing machinery which is a part of the apparatus.

The general type of apparatus to which the present invention is directed is shown in U.S. Patent No. 3,122,235, issued Feb. 25, 1964, to the assignee of this application. The present invention provides an improved and somewhat simplified construction which is adaptable to the closed circuit type of conveyor arrangement in combination with a dishwashing machine, and which is further adapted for other forms of installation where the closed circuit is not desired. The type of dishwashing machine incorporated in such systems is not specifically important, however it should be some type of machine adapted for continuous operation and including an internal conveyor mechanism for continuously passing racks of soiled dishes through the machine and hence past the washing and rinsing mechanisms of the machine.

In such dishwashing machines the wash liquid is continuously recirculated from a tank, through a pump, to one or more spray devices which project the liquid against the soiled dishes, pots and pans, etc. There may or may not be in addition a second such recirculating washing mechanism, and before the cleansed dishes exit from the machine they are subjected to a hot final fresh water rinse, with the rinse water being at an elevated temperature such that any bacteria on the dishes is destroyed and the dishes will air-dry quickly when discharged from the machine. Due to the continuous operation of this machine, optimum efficiency can be achieved if the racks of soiled dishes are fed in a substantially continuous, end-to-end, manner into the entrance of the machine. Thus, the racks can be carrying continuous stream of articles to be cleansed through the machine without gaps of any consequence between successive racks, or in the soiled articles contained therein.

The primary object of this invention is to provide a dishwashing system which is capable of achieving the above mentioned desired optimum efficiency of a dishwashing machine by providing apparatus capable of feeding articles to be cleansed to the dishwashing machine at a rate such that the racks containing the soiled articles are positioned, one after the other, in essentially contacting or closely spaced relation as the racks pass through the dishwashing machine.

Another object of the invention is to provide novel feed and discharging conveyor means for dishwashing machinery which conveyor means is of simplified and relatively inexpensive construction, and which may if desired be provided as an endless conveyor, operating independently of, and preferably somewhat faster than, the internal conveyor of the dishwashing machine itself.

Another object of the invention is to provide such a dishwashing system including a conveyor for feeding racks of soiled articles to the machine at a rate in excess of the rate of operation of the dishwashing machine, and wherein the conveyor is capable of relative movement with respect to the racks that it is carrying in response to a predetermined resistance to movement of the racks, whereby any spaces between successive racks placed on the conveyor, in random fashion, will tend to be reduced and/or eliminated, and the racks as they enter the dishwashing machinery will be close to or in contact with one another as they pass through the dishwashing machine.

Another object of the invention is to provide such a conveyor structure which also tends to accelerate the racks exiting from the dishwashing machine with the cleansed dishes, thereby tending to space the racks apart and thus to facilitate further handling thereof such as removal of the racks from the conveyor.

An additional object of the invention is to provide such a conveyor arrangement which is readily cleansed in order to maintain the necessary sanitary conditions required of dishwashing machinery.

Another object of the invention is to provide a conveyor system which is adaptable to various types of continuously operating dishwashing machine and in which the conveyor system is of modular construction to simplify adaptation of the system to different types of dishwashing machines.

A further object of the invention is to provide a dishwashing system as previously described, in which the conveyor mechanism is continuously washed during operation, and where the conveying system is at least to some extent self-cleaning and tends to carry any food scraps into a suitable place of collection for disposal.

Other objects and advantages of the invention will be apparent from the following description, the accompanying drawings and the appended claims.

In the drawings:

FIG. 1 is a plan view of one form of dishwashing system in accordance with the invention, showing a closed circuit conveyor arrangement;

FIG. 2 is an enlarged side elevation view, with some parts broken away to show interior details, illustrating a typical dishwashing machine incorporated into the present system;

FIG. 3 is a broken perspective view showing a section of table and channel which is a part of the conveying system provided by the invention;

FIG. 4 is an enlarged detail view, partly in section, showing a segment of a joint between table sections;

FIG. 5 is an enlarged cross-sectional view, taken on line 5—5 of FIG. 1, showing details of the drive mechanism for the conveying system, and also showing in dotted lines the open position of the cover for the conveyor chain guide channel;

FIG. 6 is an enlarged cross-sectional view, taken on line 6—6 of FIG. 1, showing details of the conveyor chain guide means and associated support structure;

FIG. 7 is an enlarged sectional view showing details of the guide channel for the conveyor chain, taken along line 7—7 of FIG. 1;

FIG. 8 is an enlarged detail section view of the idler sprocket support shown in FIG. 6;

FIG. 9 is a broken sectional view, on an enlarged scale, through one of the conveyor table sections, taken on line 9—9 in FIG. 1;

FIG. 10 is a substantially enlarged sectional detail view showing the manner in which the conveyor engages and pushes a dish carrying rack;

FIG. 11 is a broken plan view of one of the tables, showing the relation of the conveyor chain and a dishwashing rack during operation;

FIGS. 12 and 13 are enlarged plan views, with some parts broken away and shown in section, showing details of the conveyor chain guiding and drive mechanism at the exit and entrance ends, respectively, of the dishwashing machine;

FIG. 14 is a detail view showing the plumbing arrangement for the chain washing device;

FIG. 15 is a general plan view, similar to FIG. 1, showing another embodiment of a dishwashing system according to the invention;

FIG. 16 is an enlarged sectional view of a chain guide channel, taken on line 16—16 of FIG. 15;

FIG. 17 is a plan view of a modified segment of table section which may be used in the present invention;

FIGS. 18 and 19 are detail views of modifications of the conveyor pusher members which may be used in place of the pusher members shown on the conveyor chain in FIGS. 9 through 11; and FIGS. 20 and 21 are diagrammatic plan views showing other typical endless or "closed loop" systems according to the invention.

Referring to the drawings, which illustrate a preferred embodiment of the invention, and particularly with reference to FIGS. 1 and 2, the system provided by the invention incorporates a dishwashing machine of the type intended for continuous operation, such for example as shown in U.S. Patent No. 2,073,521. This machine, as shown in FIGS. 1 and 2, has a housing 10 defining a pre-wash chamber 12, a main wash chamber 14, and a rinse chamber or section 16. The sections 12 and 14 include tanks 18 and 20 therebeneath, on which are located motor driven recirculating pumps (only pump 21 is shown in FIG. 14) that withdraw washing liquid from the tanks and supply the liquid to the spray heads of the respective sections.

The spray heads 22 in the pre-wash chamber 12 direct a substantial flow of water over the soiled dishes 24, which are carried within conventional racks 25, tending to flush any waste particles and the like from the dishes and through the open structure of the racks through strainers into the tank 18. Typical rack constructions are shown in U.S. Patent Nos. 2,804,213, 3,009,579, and 3,141,552. Liquid from the main wash tank 20 is directed to the wash arm 26 and a similar lower wash arm (not shown) to flush and cleanse the dishes or other soiled articles, and this liquid in turn falls back through strainers into the tank 20. The final rinse is supplied by fresh hot water through the final rinse spray head 30, and this final rinse water is heated to a relatively high temperature, usually in the neighborhood of 180° F. or higher. After spraying over and draining from the cleansed dishes this water falls into the tank 20 and provides make-up in that tank. There is usually a partition or the like (not shown) between the tanks 20 and 18 allowing some overflow from the tank 20 into the tank 18, thereby affording make-up water for the pre-wash operation, and there is an overflow from the tank 18 to drain the manifold 31. All of this structure is well-known and is shown in detail in the prior art, for example said Patent 2,073,521.

The entrance to the housing 10, into the pre-wash chamber 12, is provided by an opening 32 which is normally covered by a flexible curtain 33. The exit from the final rinse section 16 is provided through an exhaust hood 34 which may include a damper controlled stack 35 adapted to be connected to an exhaust blower or the like to assist in carrying away steam resulting from the operation, and may also be covered with a flexible curtain. In addition, the various chambers of the machine are usually separated by some form of curtain, however these items are well known, and are omitted from the drawings for the sake of simplifying them.

The dishwashing machine includes a conveyor for moving the racks 25 through the aforementioned chamber, and one suitable form of conveyor is shown, including rails 40 provided with a plurality of dog members 42 which are adapted to engage parts 25a (FIG. 11) of the racks 25. This structure is suspended from flexible arms 43, and is oscillated by a push rod 44 connected to a pivotally mounted crank 45. This crank arm is in turn oscillated by a rod 46 which may be driven, for example, by a power take-off from one of the pump drive motors.

As shown particularly in FIG. 1, the racks 25 are supported in approaching the entrance opening of the machine on a conveyor table section 50 which includes a straight entrance portion 51 of sufficient length to assure that the rocks are squared with respect to the dishwashing machine conveyor as they enter the machine. At the exit end of the machine, there is a similar exit table section 52 which receives racks of cleansed dishes moving from the machine. In the embodiment shown in FIG. 1, the table section 50 is joined to a further curved table section 54, thus forming a 180° turn, and similarly there is a table section 55 attached to the section 52 and forming with it another 180° turn. Between the table sections 54 and 55 is a further joining table section 58 which completes a closed circuit path, about which the racks 25 can be conveyed from the exit to the entrance of the dishwashing machine.

FIG. 3 illustrates a typical cross-section of the table construction. The bottom 60 is essentially flat, and has side walls or flanges 62 extending up from its, spaced somewhat farther apart than the width of the racks 25. This permits the racks to move around the curved table sections, as shown in FIG. 1, where the racks are shown in outline. The table sections include an open top channel portion indicated by the reference number 65. Preferably, this is formed as an integral part of the bottom 60, and includes a depressed bottom wall 66 and side walls 67. This channel portion or configuration is formed through all of the table sections, as can be seen in FIG. 1 and is aligned throughout in order to provide a channel or conduit configuration for the conveyor, as will be described. In the straight table section 58 there is also a ledge 68 which serves to support racks in a tilted position, whereby they are affectively elevated with respect to the conveyor structure. This feature, as is later described, is advantageous when it is desired for any reason to retain a rack temporarily in the table section 58, for example where it might be desirable to load the articles in a rack at this point. In FIG. 4, a typical joint between table sections is shown, the flanges 68 being joined in face-to-face relation, preferably with a gasket, or a seal formed from a silicone rubber sealant 69 therebetween. A bolt and nut fastener 70 (one shown) joins the flanges, and both the flanges and these fasteners preferably are covered with a trim cap 71.

The channel configuration 65 extends throughout the table sections 50, 52, 54, 55 and 58 and along the table sections 50 and 52 into small drain tanks 75 and 76. The configuration of these tanks is shown in greater detail in FIGS. 5 and 6, respectively. Supported within the tank 75 is a drive sprocket 80 and a corresponding idler and guide sprocket 82. In tank 76 idler and guiding sprockets 84 and 85 are similarly supported. Details of the mounting and drive arrangement for these sprockets are explained hereafter.

A flexible conveyor chain 90 passes around these sprockets as shown in FIGS. 1, 12 and 13, and through the open top channel 65 which serves as a guide for the conveyor chain. The chain is of essentially conventional construction, preferably including rollers 92 formed of or covered with a synthetic resin material. The links are of conventional overlapping construction as shown in FIG. 10, with the links of greater height having bottom link parts 93 resting on the bottom surface 66 of the channel, and the corresponding opposed or top link parts 94 slightly above the level of the table bottom surface 60, particularly as shown in FIGS. 9 and 10.

The link parts 94 are formed with suitable pusher members, shown in the form of dimples 95 struck or formed upwardly from the link parts 94. Preferably, each of the link parts 94 has such a dimple or pusher member formed in it, in order to provide a plurality of regularly spaced pusher members along the length of the chain 90.

The curved table sections 50 and 54 leading to the entrance end of the machine, preferably include a guide rail 96 which provides a shoulder extending over the rollers 92 of the chain, as shown in FIG. 9. Since the chain is under tension at this section, where it passes around the curve and toward the drive sprocket, there maybe some tendency under heavy loads for the chain to work out of the open top channel 65, and the rail 96 overcomes this tendency by engaging the upper edge of the rollers 92.

The racks 25 are of conventional construction, and may be formed either of wire (sometimes plastic coated) or of a suitable plastic. A typical rack configuration is shown in FIG. 11, wherein the open mesh construction, particularly of the bottom of the rack, is illustrated. Any one or more of the dimple pusher members 95 can engage with various cross members of a rock 25. Since the racks are resting on the table surface 60, and the link parts 94 project slightly above this surface, the conveyor chain tends to support a portion of the weight of the loaded rack, however, the rack also tends to slide along at least one side of the table outwardly from the channel 65. Hence, the conveyor chain tends to push the racks along the table sections in a sliding fashion, and the table sections form some support for the racks, hence the table sections are considered an active part of the conveyor system.

It is understood that there may be several of the pusher members 95 in contact with any one rack, for example as shown in FIG. 11 there is contact between a pusher member and a rack at each of the locations indicated by the reference numeral 97. However, because of the fact that the table at least partly supports the rack, and because the upper chain parts 94 are but slightly above the level of the table surface 60, if an obstruction is presented to forward movement of a rack, the conveyor chain will tend to slide under the rack, and the fact that the walls of the dimpled pusher members 95 are sloped tends to assist in this action. Therefore, if the racks are held back, as by engaging one another, the conveyor chain will tend to overrun the racks, but there will be only a slight jostling of the racks when this occurs since very little lifting motion of the racks is needed to permit the pusher members 95 to slide under the rack structure. The ledge 68 thus provides a support at a sufficient height that, if one side of a rack is lifted onto the ledge, the central portion of that rack will be elevated with respect to the pusher members 95, and the chain can pass freely under a rack in this position. To engage the rack with the conveyor it is necessary only to move this elevated side off the ledge 68 and down into the main portion of the table section 58.

In the form of the invention shown in FIGS. 1 through 14, the conveyor means, including the chain and its associated pusher members 95, is formed as an endless conveyor, and is arranged to bypass the housing of the dishwashing machine, in order to avoid interference with, and to operate independently of, the internal conveyor of the dishwashing machine. Thus, the sprocket arrangements shown in FIGS. 1, 5, 6, 12 and 13 serve to guide the chain 90 along a path which follows one side of the dishwashing machine, and a guide channel 100 is provided for receiving and supporting the chain 90 in its travel from sprocket 80 to sprocket 84.

As shown in FIG. 7, the guide channel may be suitably fastened to a supporting angle member 102 which in turn is fastened in any suitable way to the exterior of the dishwashing machine housing 10. It is, of course, possible to have this channel located within the housing, so long as it clears the internal conveyor. Preferably, a hinged cover 103 is provided on the guide channel 100 in order to cover the chain 90, both for reasons of safety and cleanliness. As shown in FIGS. 12 and 13, the guide channel 100 opens into the respective drain tanks 75 and 76, therefore any liquid draining from the chain into this channel will in turn drain into one or the other of these tanks. In the event that any waste food particles or the like should enter the tanks 75 and 76, removable angled screens 105 and 106, respectively, are provided to screen such particles from the drain lines 109 and 110.

The conveyor arrangement preferably includes means for flushing the chain 90 in order to clear it of any waste particles or the like, and a convenient arrangement for this purpose is shown in FIGS. 13 and 14. A branch line 112 is connected from the outlet of the pump 21, through a valve 113, into a suitable nozzle 114, which may merely be an open ended pipe, but which serves to direct a flow of water against the chain 90 as it passes the end of the nozzle 114. The manually operated valve 113 serves to provide an adjustment of this flow in order to minimize splashing while still maintaining an adequate flow to flush the chain thoroughly. Since this liquid is being withdrawn from the pre-wash tank 18, the drain line 109 is directed back to that tank as shown in FIGS. 5 and 14, so that the liquid used to flush the chain is recirculated. In the event that this chain flushing arrangement is desired in a system with a dishwashing machine that does not have a pre-wash system, then the water to valve 113 can come from an external water source and the drain line 109 can be merely connected to the drain manifold 31. The drain line 114 from tank 76 is connected to the drain manifold 31, as shown in FIG. 2.

The conveyor chain 90 carries the racks 25, loaded with soiled dishes or the like, to the entrance opening 32 of the dishwashing machine. As the chain 90 passes around sprocket 82, it is guided into a lateral path which is angled downward below the level of the table surface 60. This can best be seen by reference to FIG. 5. This portion of the travel of the chain, which is over the shallower part of the tank 75, preferably is covered by a hinged protective cover 120. This cover can be only of sufficient size to protect the region around the chain and sprocket. However, particularly where the dishwashing machine in the system has a pre-wash device, it has been found desirable to extend the cover 120 over the entire tank 75. In this way any relatively large pieces of waste will not drop into the tank 75 but will be pushed through the entrane of the machine into its pre-wash tank 18. Thus there is little likelihood of large pieces of waste collecting in the tank 75 and blocking the drain screen 105 yet any liquid on the table surface can drain around the edges of the cover 120 and into this tank. The chain 90 therefore, in passing below the level of the table surface 60, descends below the level of the bottom of the racks 25 and is no longer effective to move these racks The feed portion of the conveyor means thus carries the racks to the feed opening 30, where the stationary guid arm 115 (FIGS. 5 and 13) helps to align the racks, and leaves them in position to be picked up by the dogs 42 of the dishwashing machine internal conveyor, which then takes over carrying of the loaded racks through the dishwashing machine. The chain passes laterally and somewhat downwardly around the drive sprocket 80 and into the guide channel 100.

At the exit end of the machine, where the racks are kept aligned by the arm 117, the chain passes around the guide sprocket 84 and then in an upward and inward direction, to around the idler sprocket 85, whereupon the chain is guided up into its normal level, with its link parts 94 slightly above the conveyor table surface 60, as shown in FIG. 6. Again, a hinged protective cover 122 is provided over the greater part of the idler sprocket 85. Due to the width of the drain tank 76, and because at this point the conveyor chain 90 is beginning to engage racks being pushed from the exit of the dishwashing machine, it has been found desirable to form an extension 124 from the adjacent channel 65 in the table section 52. This assures that the pusher members 95 remain at the proper elevation and the conveyor tends to carry the racks away from the exit end of the dishwashing machine.

As previously mentioned, it is important in the installation and operation of dishwashing machinery that the entire system be readily cleansed, and any simplification of construction in this respect is of definite time and trouble saving advantage in the maintenance of the system. In the present arrangement the conveyor chain rests in the open top channel 65, and in operation the tension due to the power applied to the chain (as will be described) in the location of the inlet end of the dishwashing machine, tends to pull the chain tight against the side of the channel as the chain passes through the table sections 50 and 54. On the other hand, the chain tends to run somewhat slack around the table sections 52 and 55, depending, of course, upon the amount of load placed on the conveying system. with the system shut down, the chain is sufficiently slack to be readily lifted from the guide channels, and these can be thoroughly flushed, along with the chain, to wash away any waste particles which may have collected therein. During operation the chain will tend to pull waste particles along the channel, and these may either drop into the drain tank 75, or in some instances a tank 123 may be provided having a conventional food waste disposing unit in it, which may also be used in the process of scraping dishes as they are loaded into the racks. In such an installation the area adjacent to the table section 50 may be used as a loading station. The system provided by the invention thus provides for readily cleansing the conveyor and its channel, and in any location where the channel or other conveying machinery is covered, the covers are hinged in order to be easily opened for cleaning.

As previously mentioned, one purpose of the present invention is to provide a dishwashing system in which the loaded racks are advanced to the entrance of a conventional dishwashing machine at a rate such that the racks tend to follow one another closely through the machine. The relationship is shown particularly in FIGS. 1 and 2. Thus, the drive for the conveyor chain 90 is such that it can be adjusted to a speed sufficiently greater than the operating speed of the internal dishwashing machine conveyor to achieve this purpose. The speed of the conveyor chain should have a sufficient range of adjustment to be adaptable to different dishwashing machines, which may have somewhat different capacity and different speeds of operation of their internal conveyor. As an illustration of typical speed relationship, and without limiting the invention to these particular relationships, the following speeds have been employed. In one example the internal machine conveyor has been operated at 7.5 feet per minute, and the conveyor chain 90 has been operated at approximately 9.5 feet per minute. In another typical installation the internal conveyor of the dishwasher has a speed of about 5.4 feet per minute, and the feeding conveyor was operated at about 7 feet per minute. It has been found that a separate adjustable drive arrangement is most effective for this purpose, and a suitable drive is shown in FIG. 5.

The idler and guide sprocket 82 is supported on a stub shaft 125 which is rotatably supported on a post 126. This post includes a flange 127 bolted, and suitably sealed, to the bottom wall of tank 75. The drive sprocket 80 is connected to be rotated by a drive shaft 130 which is mounted in a similar supporting post 132 having a flange 133 fastened and sealed to the bottom of the tank. Preferably, a rigid integral spacing arm 135 is provided connecting the posts 126 and 132 in order to maintain proper alignment and spacing thereof. The other end of drive shaft 130 is fastened to a friction clutch 140, which provides a safety release in the event that the chain 90 is jammed for some reason.

The input to this clutch is provided from a conventional speed reducer (details not shown) contained within a casing 142 and receiving its input power from a V-belt pulley 144. A suitable electric motor 145, having a variable sheave 146 on its output shaft, is connected through a V-belt 147 to the pulley 144. The motor 145 is supported on a platform mount 150 which is in turn pivotally mounted on supporting pins 152 which are carried on the drive support platform 155. A threaded shaft 157 has one of its ends secured to the pivoted motor mount 150 (while providing for rotation of the rod) and the rod is threaded through a suitable adjustment nut mounted on a shaft 158 that is also supported on the platform 155. By rotating the hand wheel 160, fastened to the other end of the threaded shaft 157, the entire motor and platform assembly can be pivoted about the pin 152, producing a change in diameter of the adjustable sheave 146, which thereby changes the speed at which the pulley 144 is driven, hence providing an adjustable speed input to the conveyor drive.

At the exit end of the machine, the mounting for the guiding and idler pulleys 84 and 85 is arranged to provide an adjustment for taking up slack in the conveyor chain. Details of this arrangement are shown in FIGS. 6 and 8. The hollow post 170 has an integral flange 172 which is bolted and sealed to the bottom of the tank 76. Within the post 170 there is an adjusting shaft 175 having a flange 176 formed as an integral part of its upper end. Above this flange there is a shaft end portion 178 on which the idler sprocket 85 is supported for free rotation, being held in position by a snap ring 179. The flange 176 is received within a cavity in one end of an arm 180, and there is a tang 182 extending from flange 176 into a corresponding aperture or socket in the arm 180, whereby the shaft 175 and arm 180 will tend to rotate together. A shim 183 preferably is provided between the end of arm 180 and the upper surface of the post 170.

Referring to FIG. 6, the outer end of the arm 180 supports the idler sprocket 84, through a stub shaft 185 to which the sprocket is retained by a snap ring 186. Thus, rotation of the arm 180 will determine the position of the sprocket 84, and hence determine the length through which the chain must travel around sprocket 84 and 85. Referring to FIG. 12, rotation of arm 180 in a clockwise direction, as viewed from the top, will tend to take up slack in the chain.

Referring again to FIG. 8, at the bottom of the post 170, outside the tank 76, there is a locking device including an upper washer 190 having a tang 192 received in a slot within the post 170. The lower face of this washer has a number of teeth or serrations, and a cooperating lower washer 195 with teeth on its upper surface is received beneath the washer 190. The lower washer has a key-like tooth 196 extending into a keyway 197 formed in the lower end of shift 175. The washer 195 also has an arm 198 extending to one side. When the teeth of the two washers 190 and 195 are engaged, they will prevent relative rotation between the post 170 and the shaft 175, but if these washers are separated such rotation can occur. The shaft 175 has a threaded end 200, and a lock nut 202 is received thereon and is arranged to press against a cap 204 which can exert pressure against the lower washer 195. Thus, when the nut is tightened the washers are pressed into engagement and the shaft 175 and the arm 180 are fixed in position. It is thus possible to take up slack in the conveyor chain, and to adjust the tension in the chain, by loosening the lock nut to withdraw the cap and permit relative rotation between the two serrated washers in the desired direction.

With reference to the chain link members 94, it is of course possible to provide somewhat different arrangements of pusher members thereon. Two suitable modifications are shown in FIGS. 18 and 19. In FIG. 18 the upper link member 94a is shown as including an integral upwardly formed ridge 95a forming a pusher member which extends entirely across the link. Again, the upper surfaces of this pusher member are sloped such that predetermined resistance to movement of the racks will result in a type of cam action, enabling the links to move under the racks with a minimum of resistance, the force required being much less than that required to stall the conveyor. The modified form shown in FIG. 19 includes a flat link member 94b having attached to it a round head screw which forms the pusher member 95b. Again, this type of construction provides the necessary cam action to allow the conveyor to move relative to the racks when necessary. In outward appearance, the form shown in FIG. 19 is similar to the "dimple" form shown in FIGS. 9–11.

The system provided by the invention is not limited to endless conveyor arrangements which handle both feeding and discharging of racks to and from the dishwashing machine. Various modifications will be apparent to those skilled in the art, and FIG. 15 shows a typical modification in which the overall arrangement is a U-shaped system with a dishwashing machine 10a (which may be of any suitable type as mentioned) located at the base of the U. The entrance table sections are of the same general construction as previously disclosed. At the entrance to the machine there is a straight table section 50a, and leading into it a curved table section 50b. The table section 50a includes the conveyor drain tank 75a. A longer straight entrance table section 220 is attached to the other end of the table section 50b, and all of these table sections are modified to the extent that a guide channel 225 is constructed along one side of the table sections, details being shown in FIG. 16. Thus, a number of supporting brackets 226 may be fastened to the undersurface of these table sections, forming a type of cantilever support for the member 227 which defines the channel 225. Preferably, hinged covers 228 are provided for the channel in order to minimize the entrance of dirt and waste into the channel. These covers can be opened for purposes of cleaning or repair.

At the farthest end of the table section 220 there is a central tank 75b, which may be of the same general construction as the tanks 75 and 76, including a strainer screen and a drain connection. The drive for the conveyor chain 90a is shown schematically at 230, being connected to the drive sprocket 80a, which is mounted in the region of the tank 75a, along with the idler sprocket 82a. Details of this drive and idler sprocket arrangement can be the same as shown in FIG. 5. At the other end of the entrance conveyor system, in the region of the tank 75b, there is a pair of idler sprockets 232 which may be mounted in the same manner as shown in FIG. 6, in order to provide slack take-up and proper guidance of the conveyor chain 90a.

In this system the aforementioned parts form an entrance or supply conveyor means which can be adjusted to carry the loaded racks to the machine. The same type of adjustable speed drive (as in FIG. 5) can be provided, such that the speed of the conveyor chain 90a can be set at a rate somewhat greater than the rtae of operation of the internal conveyor of the dishwashing machine 10a. Thus, the supply conveyor means tends continually to carry the loaded racks to the entrance table section 50a, and as these racks are slowed in leaving the conveyor chair 90a and await pickup by the internal dishwashing machine conveyor, additional loaded racks will be moved into position immediately behind, thereby tending to supply the machine at its optimum capacity.

The discharge conveyor means is of similar construction, but provided with an independent drive. As shown in FIG. 15, this discharge conveyor arrangement includes the table section 52a, which contains a drain tank 76a, attached to a curved discharge table section 52b. At the other end of this table section there is an elongated table section 240, provided with the same general channel arrangement as the other table sections, thereby forming a guide path for the conveyor chain 90b. This conveyor chain is guided at the table section 52a by idler sprockets 84a and 85a, which can be supported in the same manner as shown in FIG. 6, including the arrangement for taking up slack in the chain. The table sections 52a, 52b and 240 are provided with the same form of guide channel 225 for the return flight of the chain, and at the farthest end of the table 240 there is a drain tank 76b in which are mounted a drive sprocket 242 and an idler sprocket 243, in the same manner as shown in FIG. 5. The drive sprocket is driven from an adjustable speed drive indicated schematically at 245, and which may be of the same type of construction shown in FIG. 5.

Again, due to its adjustable speed drive, the conveyor chain 90b can be driven at a speed correlated to the operating speed of the internal dishwashing conveyor. The speed of the chain 90b should at least match the speed of the internal dishwashing machine conveyor, and preferably the chain 90b moves at a somewhat faster rate than the internal dishwashing machine conveyor in order to accelerate the racks of cleansed dishes away from the exit end of the dishwashing machine, and to move these racks rather rapidly into the table section 240, from whence the racks can be unloaded and stacked, or carried away on carts, as the particular installation may require.

In connection with the endless systems, as shown in FIGS. 1, 20 and 21, it has been found desirable in some instances to utilize a protective switch for the purpose of preventing racks of cleansed articles from being carried inadvertently to the adjacent loading station. As previously mentioned, referring to FIG. 1, the cleansed racks exit from the dishwashing machine one after the other, ordinarily closely spaced, and the area surrounding the table sections 52 and 55 can be considered the unloading station. In some cases the racks may be lifted bodily and stacked elsewhere, where in other instances the articles may be unloaded from the racks. Where the racks are to be removed from the system, it is desirable that this be done before the bottoms of the racks pass to the table section 58, where soil and contaminated liquid may be present. Otherwise, this liquid may collect on the bottom of the racks containing clean articles, and when these racks are stacked this liquid will drip onto the clean articles.

To avoid this, a switch operating arm 247 is mounted to extend over the table section 58 adjacent its joint with the table section 55. This arm controls an electrical switch 248 mounted exteriorly of the table section 58. This switch is adapted for connection into the main control and electrical power supply of the system, and the circuit is arranged (in any suitable way known to those skilled in the art) to stop at least the conveyor drive until a rack engaging the arm 247 is removed. For economical reasons it is preferable that the dishwashing machine be stopped at the same time. The controls governed by the switch 248 have been arranged to deactivate the entire power supply to the system, requiring that the main starter be actuated again, and in another installation the switch 248 stops the system momentarily and the system is arranged to start automatically once the rack pressing against the arm 247 is removed. The needs of a particular installation will control as to which type of arrangement is preferred.

The modification shown in FIG. 15 is typical of the versatility of the dishwashing systems provided by the present invention. The table sections for the conveying systems can be made in various shapes and lengths, and can be provided in a type of modular construction whereby any desired configuration of entrance and discharge conveyor means can be provided. As an example, a "45° turn" table section 250 is shown in FIG. 17, incorporating a central chain guiding channel 65a. This type of table section together with the "90° turn" sections such as 50a and 50b, and the straight table sections of various length, can be assembled in various configurations to provide a wide variety of system arrangements.

FIGS. 20 and 21 illustrate other typical arrangements of dishwashing systems according to the invention, in which an endless type of external conveyor system is employed. In FIG. 20 the system is constructed around a post or other obstruction which might for example be a part of the building structure in which a kitchen is located. The dishwashing machine, as shown, is located on one side of the post and the table sections are arranged to form an endless conveying structure which is generally triangular in shape, with rounded corners. In the rectangular endless arrangement shown in FIG. 21, the dishwashing machine is located in an area between two dining rooms, as an example, and the sections of the conveying system which extend generally at right angles to the dishwashing machine are located to form areas where soiled dishes can be loaded and clean dishes can be removed from the system, in areas adjacent to each dining room. Thus, one continuously operating system can readily and conveniently handle two different dining areas from a central location, providing convenient separate loading and unloading stations for each dining room.

The features of the invention are available throughout, however. The conveyor systems are of relatively simple and inexpensive construction, and are open or readily accessible to provide for easy cleaning of the entire system. This is of particular importance in connection with dishwashing systems where sanitary facilities are required. The drive and idler sprockets are of conventional types, and are readily available, along with the various major components of the adjustable speed drive systems. The entrance conveyor means, in particular, is readily adaptable to correlate its speed of operation with the operating speed of the internal dishwashing machine conveyor, thereby maintaining as close to an optimum efficiency of the machine as is possible, taking into consideration the somewhat intermittent demands upon dishwashing systems of this type.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a dishwashing system including a dishwashing machine having a chamber providing an enclosure containing washing and rinsing apparatus, said chamber having an inlet opening and an exit opening, and a dishwashing machine conveyor operating through said chamber to move racks of dishes and the like from said entrance opening toward said exit opening at a first predetermined speed; the improvement comprising entrance and exit table sections extending from said dishwashing machine at said entrance and exit openings respectively, said table sections being aligned respectively with opposite ends of said dishwashing machine conveyor and having a rack supporting surface adapted to support racks of soiled dishes moving toward said entrance opening and racks of cleansed dishes moving from said exit opening, conveyor means arranged for movement along said table sections to propel racks toward said entrance opening and away from said exit opening, said conveyor means including pusher members spaced along the length thereof and constructed and arranged to engage bottom portions of the racks for producing movement of the racks without interlocking engagement with the racks, means supporting said conveyor means with respect to said table sections such that said pusher members project only a slight distance from the rack supporting surface of said table sections to provide for movement of said conveyor means under and past the racks when an obstruction impedes the movement of the racks, and drive means connected to said conveyor means to move said conveyor means continuously in a direction toward said entrance opening of said dishwashing machine at a speed greater than the operating speed of said dishwashing machine whereby said conveyor means tends to move racks into end-to-end relation as the racks approach said entrance opening to eliminate space between the racks as they move through said machine.

2. The improvement in a dishwashing system as defined in claim 1, wherein said table sections include upwardly turned edges and an open top channel portion formed approximately centrally thereof and extending longitudinally thereof in generally parallel relation to said edges, and wherein said conveyor means includes a flexible chain having lower link portions resting in sliding engagement on the bottom of said channel and said pusher members are formed as extensions from the upper part of said chain projecting slightly above the open top of said channel and hence above the rack supporting surface of said table sections.

3. The improvement in a dishwashing system as defined in claim 2, wherein further table sections are provided joining said entrance and exit table sections to form a complete closed circuit path for dish carrying racks including a chain receiving channel extending around said path, and wherein said chain is an endless chain located in said channel to move through said channel in a direction from said exit opening toward said inlet opening, and means for guiding said chain to one side of and past the internal conveyor of said dishwashing machine in order to deliver racks to the internal conveyor and to carry said racks away from such internal conveyor without interfering with its operation.

4. The improvement in a dishwashing machine as defined in claim 3, including a control switch operable by a rack passing from said exit table section onto the adjacent joining table section, said control switch being constructed and arranged to stop said conveyor drive means in response to presence of a rack in position to actuate said control switch.

5. A dishwashing system as defined in claim 1, wherein said conveyor means is mounted with respect to said table sections to provide a partial support for the racks being moved over said table sections.

6. In a dishwashing machine as defined in claim 1, means associated with said entrance table section and adapted to support a rack with the bottom of the rack spaced sufficiently above said conveyor means to prevent effective contact between said pusher members and said rack.

7. In a dishwashing system including a dishwashing machine having a chamber providing an enclosure containing washing and rinsing apparatus, said chamber having an inlet opening and an exit opening, and a dishwashing machine conveyor operating through said chamber to move racks of dishes and the like from said entrance opening toward said exit opening at a first predetermined speed; the improvement comprising entrance and exit table sections extending from said dishwashing machine at said entrance and exit openings respectively, said table sections being aligned respectively with opposite ends of said dishwashing machine conveyor and having a rack supporting surface adapted to support racks of soiled dishes moving toward said entrance opening and racks of cleansed dishes moving from said exit opening, said table sections having upwardly turned edges and an open top channel portion formed approximately centrally thereof and extending longitudinally thereof in generally parallel relation to said edges, said table sections including curved portions forming 180 degree turns and a joining table section with a corresponding channel portion providing a complete closed circuit path for racks from said exit opening to said entrance opening and a chain receiving channel extending completely around said path to guide said chain from said exit opening to said entrance opening, conveyor means arranged for movement along said table sections to propel racks toward said entrance opening and away from said exit opening and including an endless flexible chain having lower link portions resting in sliding engagement on the bottom of said channel and pusher members formed as extensions from the upper part of said chain projecting slightly above the open top of said channel and hence above the rack supporting surface of said table sections, a guide channel mounted along one side of said dishwashing machine chamber and extending between said entrance and exit table sections providing a path for said chain bypassing said dishwashing machine conveyor, guide means for said chain directing said chain adjacent said entrance opening and said exit opening in a direction diverting its path of movement from said channel in said table sections to and through said guide channel, and drive means connected to said conveyor means to move said conveyor means continuously in a direction toward said entrance opening.

8. In a dishwashing system as defined in claim 7, pairs of sprockets mounted adjacent each of said inlet and exit openings and guiding said chain between said chain receiving channel in said table sections and said guide channel, supporting posts maintaining each said pair of sprockets in a plane intersecting the path of movement of said chain through said chain receiving channel and extending laterally and downwardly below said supporting surface of said table sections to guide the chain below the supporting surface adjacent said inlet opening and to guide the chain upwardly adjacent said exit opening to the level of said chain receiving channel.

9. In a dishwashing system as defined in claim 8, said conveyor drive means having an overload clutch, and a drive connection between said clutch and one of said pair of sprockets mounted adjacent said inlet opening.

10. In a dishwashing system including a dishwashing machine having a housing defining washing and rinsing chambers and washing and rinsing apparatus contained in said chambers for cleansing soiled articles passed therethrough, said housing having an inlet opening to said washing chamber and an exit opening from said rinsing chamber, and an internal dishwashing machine conveyor operating to move racks of soiled articles through said chambers; the improvement comprising an entrance table section extending from said dishwashing machine at said inlet opening and aligned with said dishwashing machine conveyor, said table section having a rack supporting surface arranged to position racks of soiled articles in alignment with said dishwashing machine conveyor, a feeding conveyor means for moving racks of soiled articles along said table section to said inlet opening including an endless conveyor chain having a conveying flight extending lengthwise of said table section approximately in the middle thereof, a depressed channel portion formed in said table section receiving and containing the conveying flight of said chain and positioning said conveying flight to maintain the upper surface thereof slightly above the level of said rack supporting surface of said table section, pusher members formed at spaced intervals on said chain and constructed and arranged to engage bottom portions of the racks to move the racks along said table section without locking engagement therewith, guide means located adjacent said inlet opening and receiving and guiding said chain to below the level of said rack supporting surface and thereby defining the forward end of the conveying flight, additional channel portions receiving the chain from said guide means and directing the chain back to said channel portion in said table section to provide a return flight of the chain, drive means connected to move said chain around the path so defined in a direction causing the conveying flight to move toward said inlet opening, and an adjustable speed control for said drive means establishing a rate of movement of said conveyor chain at a speed in excess of the speed of said internal conveyor to bring the racks closer together within the dishwashing machine than their placement on said conveying flight.

11. In a dishwashing system as defined in claim 10 means constructed to direct a flow of liquid against said chain during operation of the system to flush from said chain waste particles collected thereon.

References Cited
UNITED STATES PATENTS

| | | | |
|---|---|---|---|
| 1,666,671 | 4/1928 | Speer | 134—68 XR |
| 1,876,050 | 9/1932 | Fox | 134—67 XR |
| 1,896,407 | 2/1933 | Hoeffleur | 198—189 |
| 2,207,697 | 7/1940 | Kendall | 134—68 XR |
| 2,271,436 | 1/1942 | Lathrop | 198—229 |
| 3,040,874 | 6/1962 | Lyman | 198—189 XR |
| 3,122,235 | 2/1964 | Meeker et al. | 134—46 XR |

CHARLES A. WILLMUTH, Primary Examiner.

ROBERT L. BLEUTGE, Examiner.